United States Patent

Liang et al.

Patent Number: 5,157,917
Date of Patent: Oct. 27, 1992

[54] GAS TURBINE ENGINE COOLING AIR FLOW

[75] Inventors: George P. Liang, Palm City; George W. Beal, Palm Beach Gardens; Gary J. Dillard, Stuart, all of Fla.

[73] Assignee: United Technologies Corporation, Hartford, Conn.

[21] Appl. No.: 702,477

[22] Filed: May 20, 1991

[51] Int. Cl.⁵ .................... F02K 3/02; F02K 3/10
[52] U.S. Cl. .................... 60/226.1; 60/226.3; 60/261
[58] Field of Search ............ 60/226.1, 226.3, 261, 60/262, 266

[56] References Cited

U.S. PATENT DOCUMENTS

| | | | |
|---|---|---|---|
| 3,180,085 | 4/1965 | Gardiner et al. | 60/266 |
| 3,765,178 | 10/1973 | Hufnagel et al. | 60/261 |
| 3,866,417 | 2/1975 | Velegol | 60/261 |
| 3,915,413 | 10/1975 | Sargisson | 60/226.1 |
| 3,970,252 | 7/1976 | Smale et al. | 60/266 |
| 4,043,121 | 8/1977 | Thomas et al. | 60/262 |
| 4,064,692 | 12/1977 | Johnson et al. | 60/261 |
| 4,214,441 | 7/1980 | Mouritsen et al. | 60/262 |
| 4,813,229 | 3/1989 | Simmons | 60/204 |
| 4,926,633 | 5/1990 | Nash et al. | 60/226.1 |
| 5,020,318 | 6/1991 | Vdoviak | 60/226.1 |

Primary Examiner—Richard A. Bertsch
Assistant Examiner—Howard R. Richman
Attorney, Agent, or Firm—Edward L. Kochey

[57] ABSTRACT

A turbofan engine uses fan air to cool bounding surfaces of the exhaust duct at all times. A portion of the fan air flow is used for augmentor combustion in the augmentation mode. In the non-augmented mode the flow for combustion is stopped and the cooling air is used to cool the tail cone and exit guide vanes. Infrared radiation is thereby reduced when non-augmented.

3 Claims, 4 Drawing Sheets

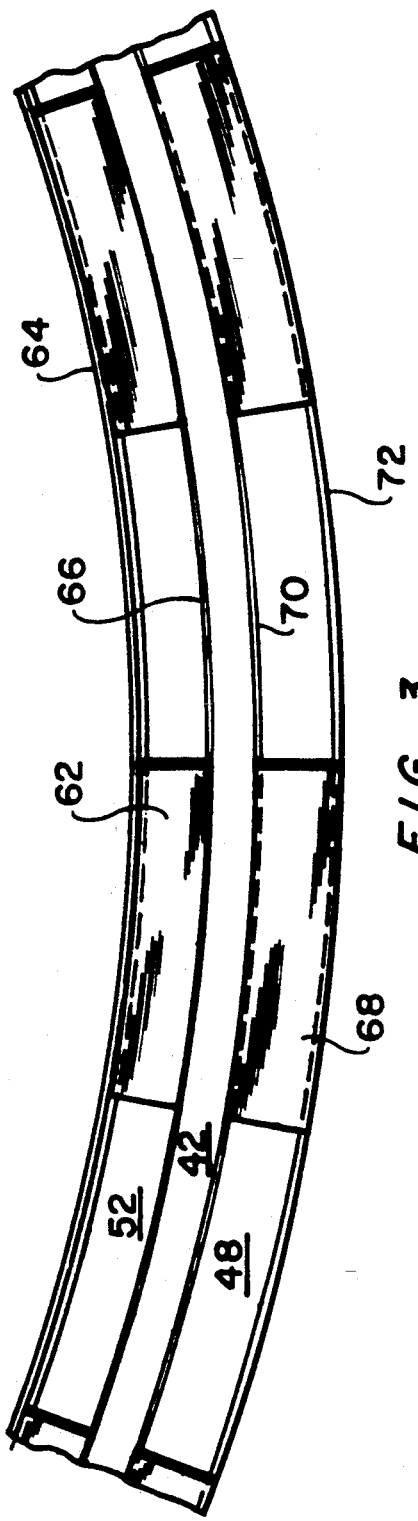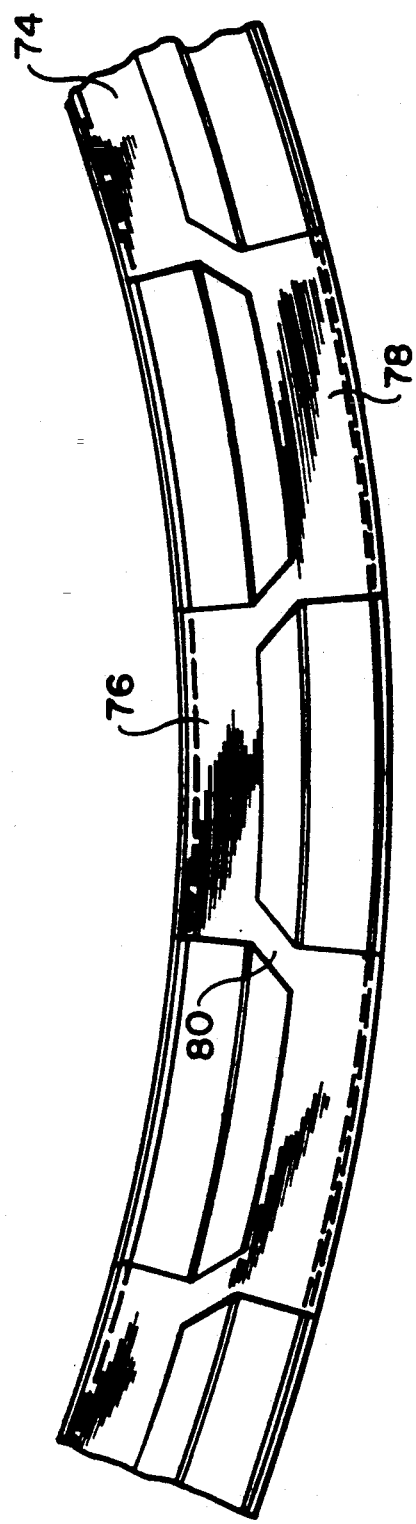

GAS TURBINE ENGINE COOLING AIR FLOW

The government has rights in this invention pursuant to a contract awarded by the Department of the Air Force.

TECHNICAL FIELD

The invention relates to gas turbine engines with augmentors and in particular to infra-red radiation suppression when not in the augmentation mode.

BACKGROUND OF THE INVENTION

In gas turbine engines the tailcone and exhaust guide vanes become hot as a result of the turbine exhaust gases passing thereover. As a source of infra-red radiation these provide a target source for heat-seeking missiles. A reduction of the temperature when in the non-augmented mode is therefore desirable.

In an augmented turbofan engine it is usual to supply fan air to the augmentor. This fan air continues whether or not the augmentor is in operation since it mixes with the core flow gases and aids in engine thrust.

SUMMARY OF THE INVENTION

A turbofan engine has a core flow and a fan flow with a centrally located tailcone centerbody at the turbine exhaust. A plurality of hollow guide vanes pass through the core flow and support the centerbody. A fan air duct surrounds the core flow.

An outer tailcone surface bounds the core flow extending around the downstream of the centerbody. An annular augmentor chamber is spaced from and surrounds this outer tailcone surface. A plurality of fuel nozzles are located in the augmentor chamber with a fuel supply manifold connected to supply fuel to these nozzles for augmented operation.

A centerbody coolant path extends through the guide vanes and through the tailcone centerbody, and then through discharge openings in the centerbody, for the purpose of cooling the vanes and centerbody in the presence of cooling air flow. A bounding coolant flow path is established for cooling the outer tailcone surface. An augmentor flow path exists for conveying combustion supporting air to the augmentor. These three flow paths are in parallel flow relationship and all receive air from the fan duct.

The boundary coolant flow path is permanently open. The augmentor flow path has a closeable port at the inlet and the centerbody flow path has a closeable port at the inlet. A valve alternately opens either the augmentor port or the centerbody port so that flow passes through only one of these flow paths. Flow is passed through the augmentor port for afterburning operation to support the combustion of fuel. When not in the augmented mode cooling air passes through the guide vanes and centerbody for the purpose of further cooling the structure and decreasing the infra-red radiation. During augmentor operation the temperature of the guide vanes and centerbody is irrelevant insofar as infra-red radiation is concerned.

The actuator for moving the valve receives its driving force directly from the augmentor fuel pressure. Accordingly, when augmented operation is started the valve immediately moves to the augmentor port open position and spring loading may be used to return the valve in the absence of fuel pressure

BRIEF DESCRIPTION OF THE DRAWINGS

and FIGS. 3, 4 and 5 are views of the distribution valve.

DESCRIPTION OF THE PREFERRED EMBODIMENT

Figure 1:
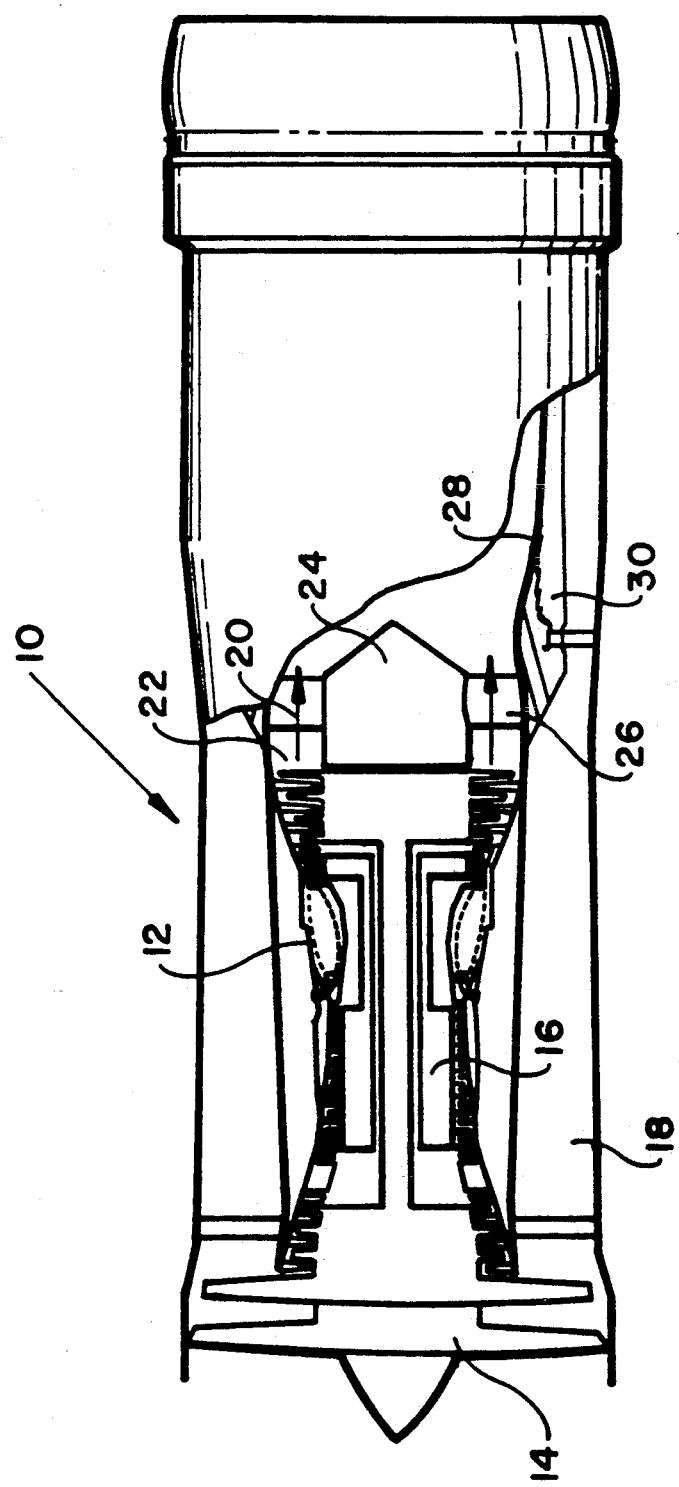
FIG. 1 is a schematic sectional view of a turbofan engine.

Referring to FIG. 1 there is shown a turbofan engine 10 with combustors 12, a low shaft 14 having a compressor and turbine, and a high shaft 16 having a compressor and a turbine. The fan air passes through duct 18 while the core air flow 20 passes through core 22. Tailcone centerbody 24 is located at the gas turbine exhaust. Guide vanes 26 straighten the gas flow and support the centerbody. Outer tailcone surface 28 bounds the core flow. Surrounding this is an annular augmentor chamber 30.

Figure 2:
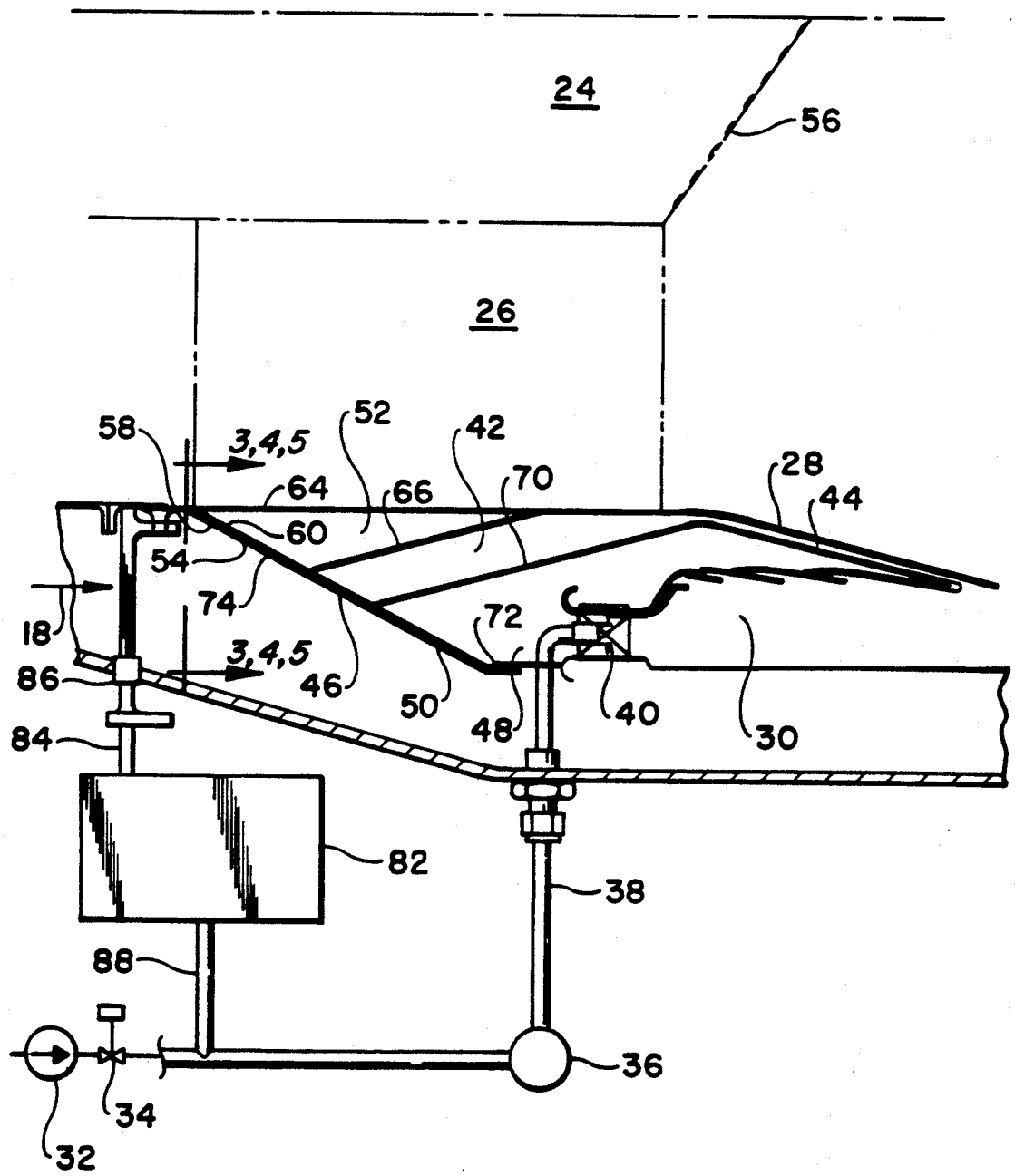
FIG. 2 is a section showing the fan air duct and the air supply to the tailcone centerbody, the outer tailcone surface and the augmentor.

Referring to FIG. 2 fuel pump 32 and augmentor fuel control valve 34 are schematically shown. Augmentor manifold or header 36 is connected through a plurality of lines 38 to a plurality of fuel injectors 40. These are arranged to inject fuel into the augmentor chamber 30.

A boundary coolant flow path 42 is arranged to take air from fan air 18 passing it through opening 44 for cooling the tailcone boundary surface 28. This flow enters at boundary flow path port 46. An augmentor flow path 48 controlled by a valve at inlet port opening 50 is operable to deliver air to augmentor chamber 30 as combustion supporting air for the fuel injected through injectors 40.

Also arranged to take air from fan air 18 is the centerbody coolant flow path 52 with centerbody port 54. This air passes through the turbine exhaust guide vanes 26 and the tailcone 24 exiting through a plurality of coolant openings 56 in the centerbody and the turbine exhaust guide vanes.

During augmentor operation combustion supporting air through port 50 and augmentor duct 48 is required for the augmentor. In accordance with conventional practice this air flows at all times.

Here, however, when augmentor operation is not required, the air flow is closed to the augmentor flow path and cooling air passes through the centerbody flow path 52 for cooling of the exhaust guide vanes and the tailcone centerbody thereby lowering the infra-red radiation.

Figure 5:
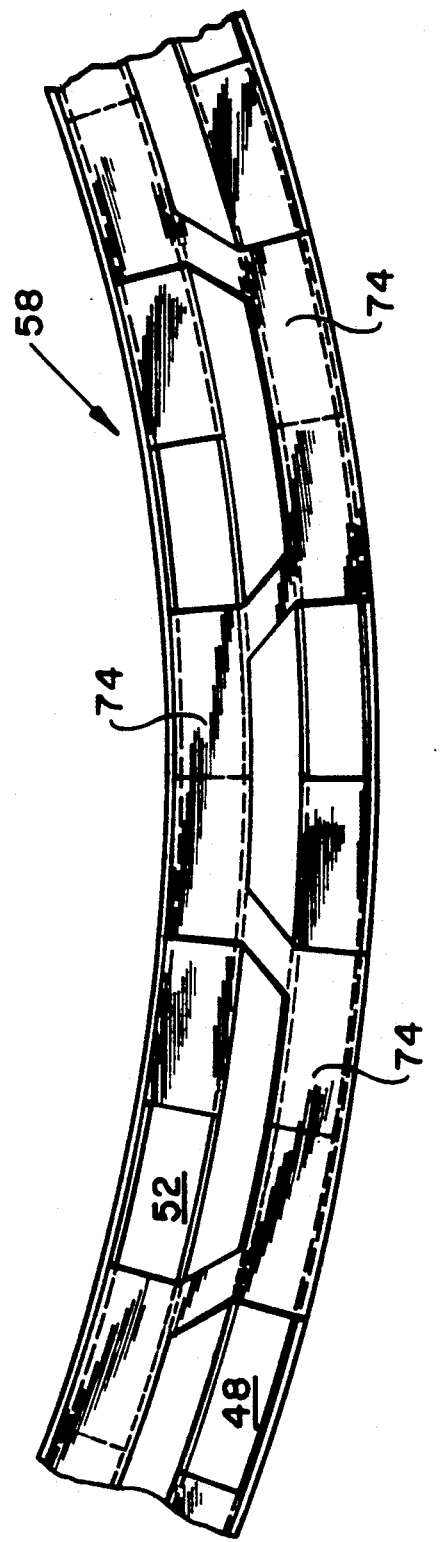

This is accomplished with ring valve 58 shown in more detail in FIG. 3, 4 and 5. FIGS. 3, 4 and 5 show the valve 58 in more detail. It is the object of this valve to maintain a continuous flow through port 46 into boundary coolant flow path 42 while alternately closing one of the augmentor flow path or the centerbody flow path while closing the other of these two.

A stationary member 60 is formed with intermittent centerbody flow path baffles 62 secured between the inner wall 64 and a division wall 66. Intermittent augmentor air flow path baffles 68 are secured between division wall 70 and the outer wall 72. Referring to FIG. 4, the moving ring 74 of the valve is shown in place with the baffles of FIG. 3 omitted for clarity This ring has a series of inner ring baffles 76 and outer ring baffles 78 connected with canted sections 80 whereby a continuous ring may be formed operative to open and close the various ports.

FIG. 5 shows the valve in a half open position with the moving ring 74 overlaying the stationary structure It can be seen in FIG. 5 that if the ring 74 is moved further to the left, it closes off port 48 while further opening port 52. This effects the shut-off of the augmentor air flow and opens the port to the centerbody air flow. Conversely moving in the other direction will open the flow to the augmentor while closing the flow to the centerbody.

Referring to FIG. 2, actuator 82 through drive rod 84 pivots around support 86 to rotate the moving ring 74. A fuel supply line 88 permits fuel to pass to actuator 82, this fuel being used as the power driving fluid within the cylinder.

When fuel pressure exists within header 36 for the purpose of establishing an augmented flow, this fuel pressure also exists in line 88 sending fuel to the fuel actuator 82. Accordingly, valve 58 is automatically moved into the augmentor flow open position in the presence of fuel pressure in the augmentor supply system. A spring return on the valve permits closure of the augmentor air flow port and opening of the centerbody coolant flow port when augmentor flow stops.

We claim:

1. In a turbofan engine having a core flow and a fan flow, the improvement comprising:
   a centrally located tailcone centerbody at the turbine exhaust;
   a plurality of hollow guide vanes passing through said core flow and supporting said centerbody;
   a fan air duct surrounding said core flow;
   an outer tailcone surface bounding said core flow;
   an annular augmentor chamber spaced from and surrounding said outer tailcone surface;
   a plurality of fuel nozzles in said augmentor chamber;
   a fuel supply manifold fluidly connected to said plurality of nozzles for supplying fuel to said nozzles;
   a centerbody coolant flow path through said guide vane and said tailcone centerbody, and through discharge openings in said centerbody;
   a boundary coolant flow path for cooling said outer tailcone surface;
   an augmentor flow path for conveying combustion supporting air to said augmentor chamber;
   said centerbody coolant flow path, said boundary flow path and said augmentor flow path connected in parallel flow relationship to receive air from said fan air duct;
   a permanently open port at the inlet of said boundary coolant flow path;
   a closable augmentor port at the inlet of said augmentor flow path, having an augmentor port open position;
   a closable centerbody port at the inlet of said centerbody flow path, having a centerbody port open position; and
   valve means for alternately opening one of said augmentor port and said centerbody port, while closing the other of said augmentor port and said centerbody port.

2. An apparatus as in claim 1 comprising also:
   an augmentor fuel supply header;
   means for supplying fuel under pressure to said augmentor fuel supply header; and
   actuating means responsive to fuel pressure in said header for moving said valve to the augmentor port open position in the presence of pressure, and to the centerbody port open position in the absence of pressure.

3. An apparatus as in claim 2 comprising also:
   said actuating means comprising a hydraulic actuator directly driven by said fuel.

* * * * *